June 24, 1930.　　　L. H. HOPEWELL　　　1,766,637
COLOR LAMP
Filed May 4, 1928　　　2 Sheets-Sheet 1
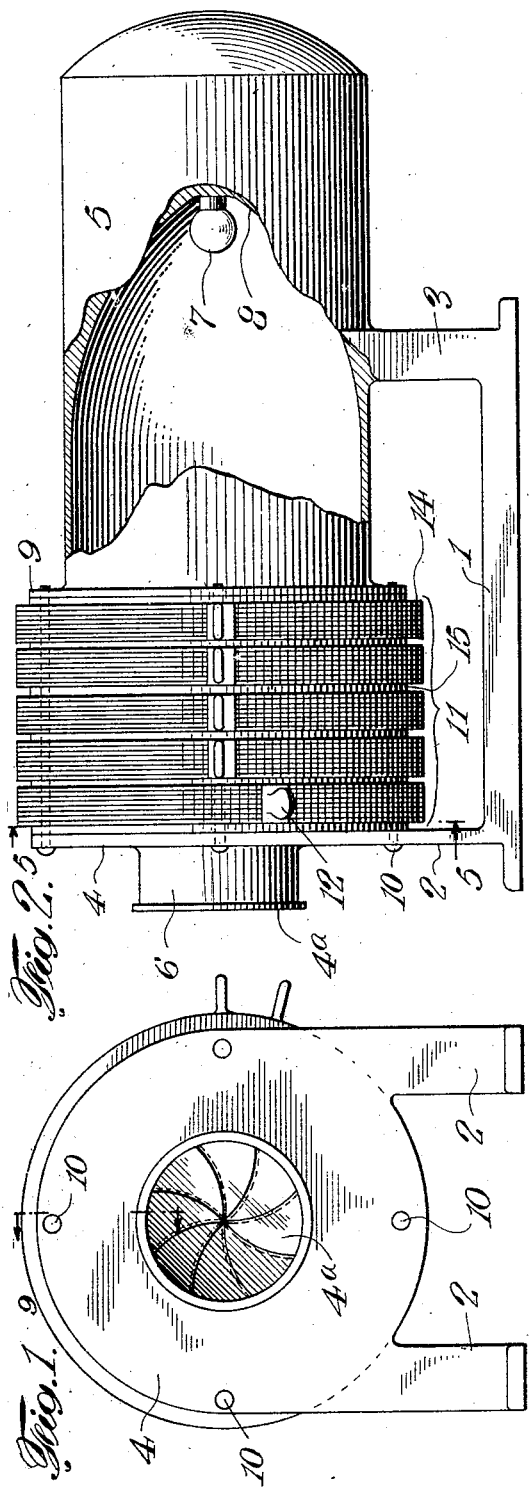
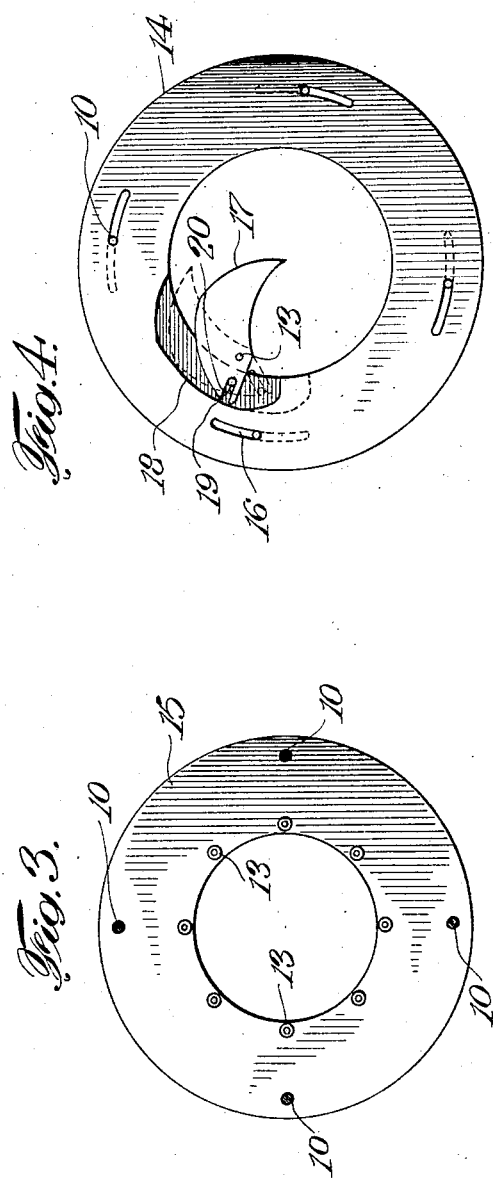
INVENTOR.
Lester H. Hopewell
BY
Emery, Booth, Janney & Varney
ATTORNEYS.

June 24, 1930.  L. H. HOPEWELL  1,766,637
COLOR LAMP
Filed May 4, 1928  2 Sheets-Sheet 2
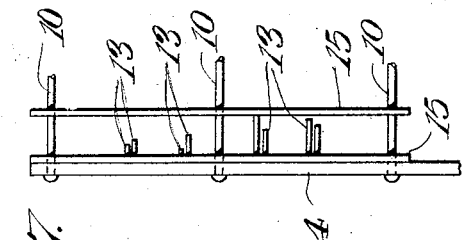
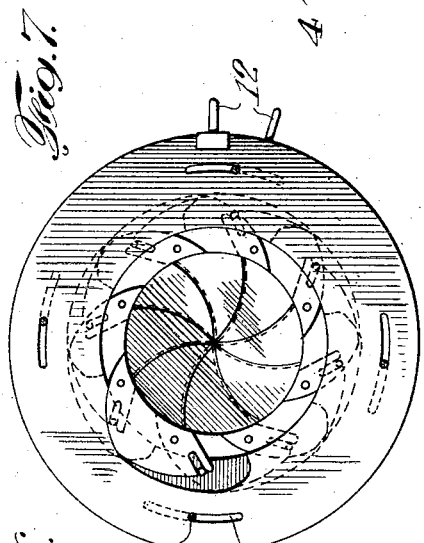
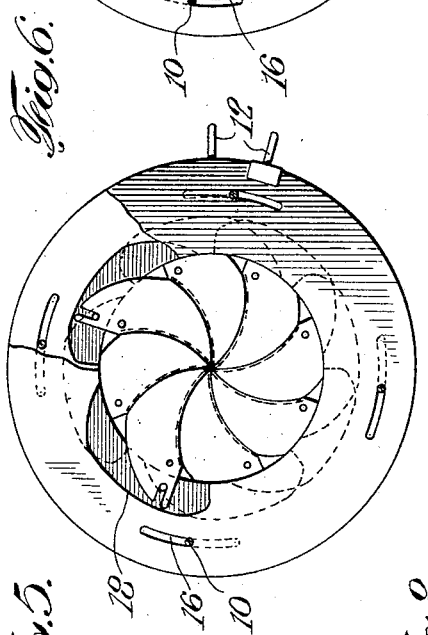
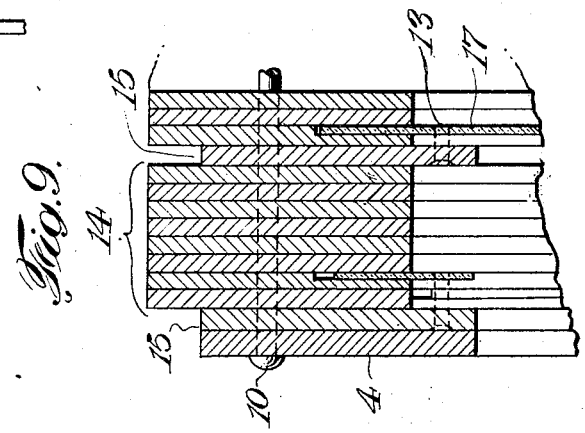
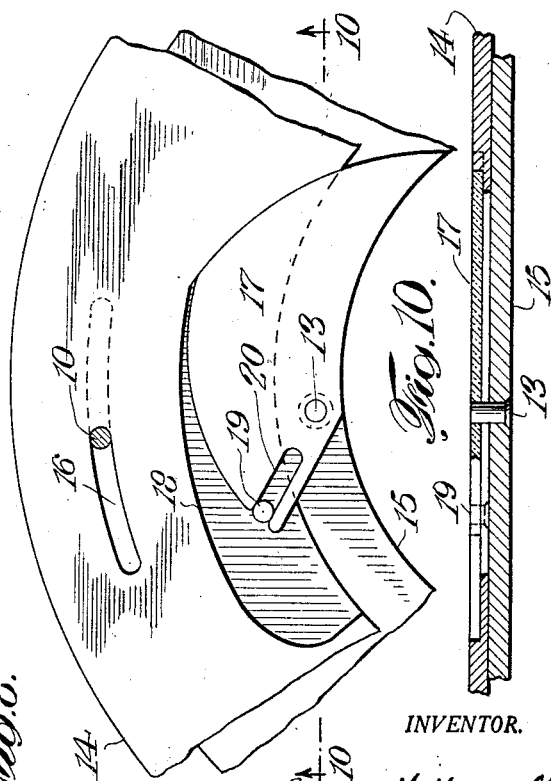
INVENTOR.
BY Lester H. Hopewell
ATTORNEYS.

Patented June 24, 1930

1,766,637

UNITED STATES PATENT OFFICE

LESTER H. HOPEWELL, OF BROOKLYN, NEW YORK

COLOR LAMP

Application filed May 4, 1928. Serial No. 275,054.

This invention relates to the art of light projection and more particularly to a lamp having one or more transparent or translucent iris diaphragm or shutter type color screens which may be employed to control the color of the projected light rays. Hereinafter the expression "translucent" will be used to denote broadly the property of transmitting light rays, as distinguished from "opaque."

Among others, it is an object of this invention to provide a lamp having a color screen whose area in the path of the projected light rays may be readily varied, and which may be used alone or in combination with other color screens for controlling the color of the projected rays.

The drawings disclose one embodiment of the invention but the invention is not to be limited thereby but only by the scope of the appended claims.

In the drawings:—

Fig. 1 is a front view of a lamp constructed in accordance with the invention;

Fig. 2 is a side view of such a lamp with a portion of the reflector casing broken away;

Fig. 3 is a front view of a separator piece, a plurality of which are found in the lamp of Figs. 1 and 2;

Fig. 4 is a front view of one operating disc, and discloses a shutter element adapted to co-operate with such a disc;

Fig. 5 is a sectional view on the line 5—5 of Fig. 2, showing the front shutter closed, and a portion of the top operating disc broken away;

Fig. 6 is a sectional view on the same line as Fig. 5, but with the front shutter open and one of the following shutters closed;

Fig. 7 is a side view of a front portion of Fig. 2 with the operating disc removed so as to show the fixed frame and a separator piece;

Fig. 8 is an enlarged view of a portion of Fig. 5, showing in detail one element of a shutter and its relation to the separator piece and operating disc;

Fig. 9 is a partial vertical section of a lamp of Fig. 1 on line 9—9 of that figure; and Fig. 10 is a sectional view on line 10—10 of Fig. 8.

A lamp constructed in accordance with this invention is adapted for use in theatres for stage lighting, or for the projection of colored light rays upon any suitable background.

By this invention a color screen is provided which comprises a plurality of colored blades or iris leaves of glass or any other suitable translucent material pivotally arranged around the inner edge of a circular frame which defines the path of the light rays. These blades may be rocked about their pivots to project into the path of light rays in such a manner as to gradually decrease the area of the opening through which the light rays may pass uncolored by the screen elements.

It will be seen that by the use of a plurality of different color screens of this type it is possible to secure unusual effects in color combinations, and in the blending from one color into another.

Referring to the drawings, a frame for supporting the lamp and shutter screens is shown as comprising parallel members 1 having legs 2 and 3 extending substantially at right angles thereto.

Legs 2 support an end plate 4 having a circular opening 4ª through which the light rays are to be projected. If desired, a suitable receiver for a lens or lenses, shown diagrammatically at 6, may be attached to member 4.

The legs 3 support a lamp casing 5, shown as cylindrical, which may have mounted therein a suitable reflector 8 and any suitable source of light rays, an incandescent lamp 7 being shown by way of example. The casing 5 and reflector 8 are so arranged with respect to plate 4 that the light rays will be projected through the circular opening 4ª therein.

The open end of the lamp casing 5 has an outwardly turned flange 9, and a plurality of members 10 such as bolts or rods serve to connect plate 4 to the flange 9. Plate 4 is spaced from the open end of lamp casing 5, and a plurality of shutter type color screens, indicated generally at 11, are supported between these members by the rods 10.

Each color screen comprises a plurality of operating discs 14 and a separator piece 15. The operating discs of each color screen have attached thereto a handle or other operating means 12 so that they may be moved simultaneously.

As illustrated in Fig. 3, the separator piece is a flat ring, which may be of metal, and has a plurality of openings near its outer edge through which the rod members 10 may pass.

Mounted near the inner edge of the separator piece are a plurality of pins 13 spaced at equal intervals around the central opening therein. Eight of these pins have been shown by way of example, and if desired, they may be of progressively greater lengths as shown in Fig. 7. The pins 13 form pivots for the component elements of the shutter screen as hereinafter explained.

The operating discs, illustrated in Fig. 4, are flat rings, and may also be of metal, and as shown have internal and external diameters somewhat greater than the corresponding dimensions of a separator piece. A plurality of these discs are associated with each separator piece, the number of discs being equal to the number of pins 13 on the separator piece. Each disc 14 has a plurality of arcuate slots 16 through which rods 10 may pass, and which permit each disc to be turned about a central axis perpendicular to its face, the extent of such movement being limited by the length of the arcuate slots.

On one face of each operating disc there is formed a recess 18 which extends partially around the central opening of the disc. Each such recess is adapted to receive one of the blades 17 comprising the color screen, and mounted in each recess is a pin 19 which is adapted to slidably engage a slot in one end of the blade 17.

The color screen comprises a plurality of these peculiarly shaped blades or iris leaves 17, which are preferably of colored translucent material, for example, glass. Each blade 17 is pivotally mounted intermediate its ends on a pin 13 of a separator piece 15, and as the disc 14 is turned, the reaction of pin 19 in slot 20 rocks the blade 17 about its pivot 13 to vary the area of the blade projecting into the central opening of the disc.

The full line showing of Fig. 4 is a view with the operating disc turned to the right so as to cause the blade to project into the center of the opening. The dotted line showing of Fig. 4 is a view with the operating disc turned to the left, and with the blade substantially withdrawn from the central opening of the disc into its recess 18.

It will be understood that a plurality of these operating discs, each having a similar blade element, are associated with each separator piece. The recesses 18 are relatively displaced around the central opening of the separator piece, and means, such as a handle 12, is provided to move all the discs associated with one separator piece simultaneously. With such an arrangement the blades 17 are all rocked together.

The blades 17 should be so proportioned, and so spaced around the operating disc that when they are rocked to project into the central opening the unobstructed area of this opening will be gradually decreased to zero.

It will be seen that the invention disclosed provides a means for controlling the color of projected light rays. By employing a plurality of screens of different colors, one color may be readily blended into another, and by the combined use of two or more of the shutters it is possible to produce many other colors in addition to those which may be obtained by the use of a single color screen. If desired, one of the shutters may comprise blades made of metal or of other suitable opaque material so that the light rays may be intercepted.

The invention is to be limited only by the scope of the appended claims, and what is claimed is:—

1. In combination in a device of the character described, a lamp casing, a lamp and a reflector therefor mounted within the casing, a frame comprising a flat ring mounted on the open end of the casing, a plurality of positioning rods projecting from a flat surface of the ring near the outer edge thereof, a plurality of pins projecting from the same flat surface near the inner edge thereof, a plurality of other flat rings having arcuate slots therein adapted to receive the positioning rods of the frame ring, a recess in one flat side of each of the slotted rings, the recesses of the several rings being relatively displaced around the central opening of the frame ring, a pin mounted in each recess, a plurality of colored translucent blades each having a slot near one end thereof adapted to slidably engage one of the last mentioned pins, each of the blades being pivotally mounted on one of the pins on the frame ring, and means for causing relative rotary movement between the slotted rings and the frame to rock the blades about their pivots to vary the area thereof which is projected into the circular opening of the frame ring.

2. In combination in a device of the character described, a shutter comprising a flat ring, a plurality of positioning rods projecting from a flat surface of the ring near the outer edge thereof, a plurality of pins projecting from the same flat surface near the inner edge thereof, a plurality of other flat rings having arcuate slots therein adapted to receive the positioning rods of the frame ring, a recess in one flat side of each of the slotted rings, the recesses of the several rings being relatively displaced around the central opening of the frame ring, a pin mounted in each recess, a plurality of colored translucent blades each having a slot near one end thereof adapted to slidably engage one of the last mentioned pins, each of the blades being pivotally mounted on one of the pins on the frame ring, and means for causing relative movement between the slotted rings and the frame to rock the blades about their pivots to vary the area thereof which is projected into the circular opening of the frame ring.

3. In combination in a device of the character described, a lamp casing, a lamp and a reflector therefor mounted within the casing, a frame comprising a plurality of spaced flat rings mounted on the open end of the casing with their central openings aligned and a plurality of rods projecting through the rings near the outer edges thereof and engaging the lamp casing, a plurality of pins projecting from one flat surface of each ring near the inner edge thereof, a plurality of other flat rings associated with each of the first mentioned rings, said second mentioned rings having slots therein adapted to receive the rods projecting through the frame rings, a recess in one flat side of each of the slotted rings, the recesses of the several rings for each frame ring being relatively displaced around the central opening of the frame ring, a pin mounted in each recess, a plurality of colored translucent blades each having a slot near one end thereof adapted to slidably engage one of the last mentioned pins, each of the blades being pivotally mounted on one of the pins of a frame ring, and individual means for causing relative movement between the slotted rings associated with each frame ring and the frame ring to selectively rock the blades of the frame rings about their pivots to vary the area thereof which is projected into the circular opening of the frame ring.

4. In combination, in a device of the character described, a source of light rays, a reflector therefor, a plurality of color screens adapted to be selectively projected into the path of the light rays to color them, each screen comprising a plurality of pivotally mounted colored translucent blades, and means individual to each screen for adjusting the blades of the screen to vary the area of the screen projecting into the path of the light rays.

5. In a device for controlling the color of light rays, a frame comprising a plurality of spaced discs having aligned central openings through which the light rays may be projected, a plurality of supporting rods extending through other openings in the frame discs, a plurality of other or operating discs associated with each of the frame discs, said operating discs being mounted between the frame discs and having central openings aligned with the central openings of the frame discs and also having arcuate slots through which the supporting rods may extend, a plurality of translucent blades pivotally mounted on each frame disc around its central opening and operatively associated with the operating discs to be rocked thereby to extend into the path of the light rays, and means individual to each screen for actuating the operating discs of that screen.

6. The combination in a lamp of a source of light, a plurality of translucent color screens, and means for variably and selectively projecting the color screens into the path of the light rays emitted from the source of light to control the color of the light rays.

7. In combination in a device of the character described, a source of light, means for variably controlling the color of the light rays emitted from said source comprising a plurality of colored translucent diaphragms, and means individual to said diaphragms for operating them to vary the areas of the diaphragms projecting into the path of the light rays, said last mentioned means being adjustable to any point within its operating range.

8. In combination in a device of the character described, a plurality of differently colored translucent iris diaphragms aligned with each other, means for selectively operating said diaphragms to vary the area of each diaphragm projected into the path through the aligned diaphragms, and a lens in alignment with said diaphragms.

9. In combination in a device of the character described, a source of light, a plurality of color screens, each screen comprising a plurality of translucent blades pivotally mounted in adjacent parallel planes, a plurality of means cooperating with the blades for turning them about their pivots, and means for simultaneously adjusting said last mentioned means to vary the area of the screen projecting into the path of the light emitted from said source.

In testimony whereof, I have signed my name to this specification this 27th day of April, 1928.

LESTER H. HOPEWELL.